United States Patent [19]

McBain

[11] 4,120,112

[45] Oct. 17, 1978

[54] APPARATUS FOR AGITATING A FISHING LINE

[76] Inventor: Alexander J. McBain, 5395 Frovan, Saginaw, Mich. 48603

[21] Appl. No.: 733,035

[22] Filed: Oct. 18, 1976

[51] Int. Cl.² ............................................. A01K 87/00
[52] U.S. Cl. ...................................... 43/19.2; 43/26.1
[58] Field of Search ......................... 43/6.5, 19.2, 26.1

[56] References Cited

U.S. PATENT DOCUMENTS

| | | | |
|---|---|---|---|
| 2,882,638 | 4/1959 | Moore | 43/26.1 |
| 3,422,561 | 1/1969 | McLean | 43/26.1 |
| 3,839,810 | 10/1974 | Lagasse | 43/19.2 |

Primary Examiner—Louis G. Mancene
Assistant Examiner—Robert P. Swiatek
Attorney, Agent, or Firm—Learman & McCulloch

[57] ABSTRACT

Apparatus for agitating a fishing line comprises an elongate arm mounted for movement of one end thereof in an orbital path of generally crescent configuration. The free end of the arm has a clasp for releasably attaching a fishing line to the arm. The arm is coupled to a driving motor which functions to effect continuous movement of the arm.

9 Claims, 4 Drawing Figures

APPARATUS FOR AGITATING A FISHING LINE

The invention disclosed herein relates to apparatus for effecting automatic agitation of a fishing line for the purpose of causing a lure secured to the line to simulate the actions of a live minnow or the like. It is believed by many fishermen that fish are more attracted to lures which have an intermittent or irregular movement which simulates the natural movement of smaller fish such as minnows. When trolling, a lure is drawn through the water at a more or less constant speed with the result that the movement of the lure is virtually continuous in one direction. It is well known, however, that fish do not swim continuously, but instead, successively start and stop swimming and in a number of different directions.

Some lures are so designed that they spin as they are drawn through the water, whereas others are designed to move either in a vertical or transverse undulating path. Such lures are believed to be more attractive to fish than those which merely move in a more or less straight line through the water, but unless some provision is made to interrupt the forward movement of such lures, their actions do not simulate the movements of a live fish.

An object of this invention is to provide apparatus which may be removably connected to a fishing line at the free end of which is any one of a number of fishing lures and which is operable to impart agitating movement to the lure so as to enable it to partake of movement which simulates quite faithfully the normal movement of a fish.

Another object of the invention is to provide apparatus of the character described and which is quite simple in construction and operation.

Other objects and advantages of the invention will be pointed out specifically or will become apparent from the following description when it is considered in conjunction with the appended claims and the accompanying drawings, wherein:

Figure 1:
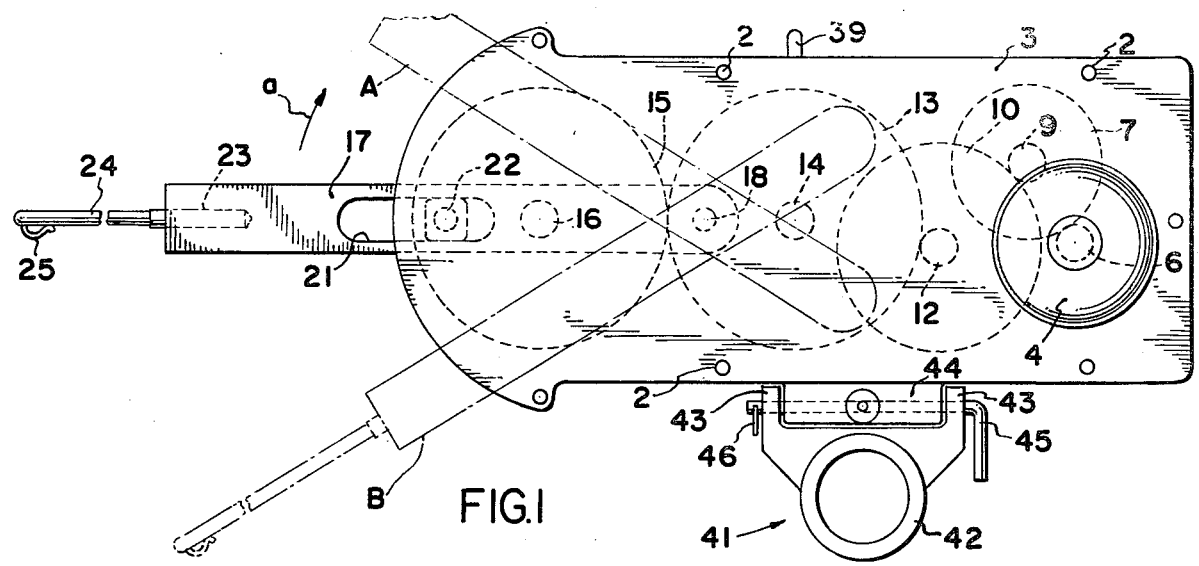
FIG. 1 is a top plan view of apparatus constructed in accordance with the invention.

Agitating apparatus constructed according to the disclosed embodiment of the invention comprises a base 1 on which is secured by screws 2 a cover 3 that overlies and is spaced from the base 1. Secured to the cover 3 is a casing 4 within which is mounted an electric motor (not shown) and a battery (not shown) by means of which the motor may be operated. The motor has a powered armature shaft 5 which extends through an opening in the cover 3 and has fixed at its free end a rotary driving gear 6 which meshes with a driven gear 7 journaled on a post 8 that is fixed to the cover 3.

Fixed to the driven gear 7 and beneath the latter is a pinion 9 which meshes with a gear 10 mounted on a post 11 carried by the base. The gear 10 carries a pinion 12 which meshes with a gear 13 journaled on a shaft 14. The gear 13 meshes with an identical gear 15 mounted on a shaft 16.

Overlying the gears 13 and 15 is an elongate arm 17 that is pivotally coupled at one end to the gear 13 by an eccentric pin 18 which projects upwardly from the gear 13 into an opening 19 formed in the arm. The arm extends through an opening 20 at one end of the casing and is of such length that it projects a substantial distance beyond the casing.

The arm 17 is coupled to the gear 15 by means of a slidable fulcrum which permits a simultaneous angular and longitudinal movement of the arm relative to the casing. The slidable fulcrum comprises a slot 21 which extends longitudinally of the arm between its opposite ends and within which is slidably accommodated an eccentric stud 22 fixed to and carried by the gear 15.

Preferably, the outer end of the arm 17 has a socket 23 for the accommodation of a rod 24, the outer or projecting end of the rod being provided with a suitable clasp 25 for the removable retention of a fishing line.

Figures 3, 4:
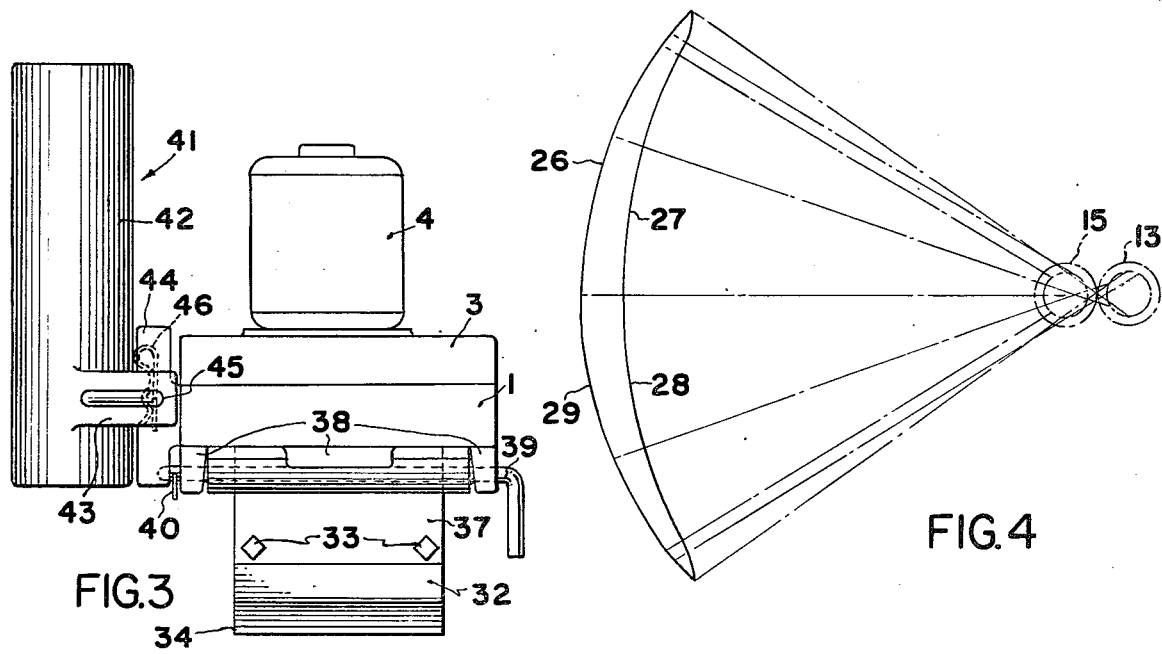
FIG. 3 is an end elevational view.
FIG. 4 is a view illustrating the path described by the free end of an arm to which the fishing line may be attached.

The construction and arrangement of the apparatus thus far described are such that energization of the electric motor will effect rotation of the driving gear 6 and consequently rotation of the driven gears 9, 10, and 12 so that the two gears 13 and 15 are driven simultaneously in opposite directions. If the gear 13 is driven 90° in the counterclockwise direction, as viewed in FIG. 1, the gear 15 will be driven 90° clockwise, the arm 17 will be rocked in the direction of the arrow a and simultaneously moved longitudinally to the right from the full line position shown in FIG. 1 to the dotted line position A also shown in FIG. 1, as is permitted by the slidable fulcrum provided by the slot 21 and the stud 22. During this movement of the arm, its free end will trace one segment 26 of a crescent-shaped path shown in FIG. 4. When the gears 13 and 15 have been rotated through 180° from the positions shown in FIG. 1, the arm 17 will have been moved from the position A to a position coinciding with the full line position, but retracted into the casing, and the free end of the arm will trace the segment 27 of the crescent-shaped path. Further rotation of the gears will effect simultaneous angular and longitudinal movement of the arm 17 through the dotted line position shown at B in FIG. 1 to the position shown in full lines, and the free end of the arm will trace the segments 28 and 29. The free end of the arm 17 thus moves angularly and longitudinally in an orbital path having substantially the crescent-shaped configuration.

Figure 2:
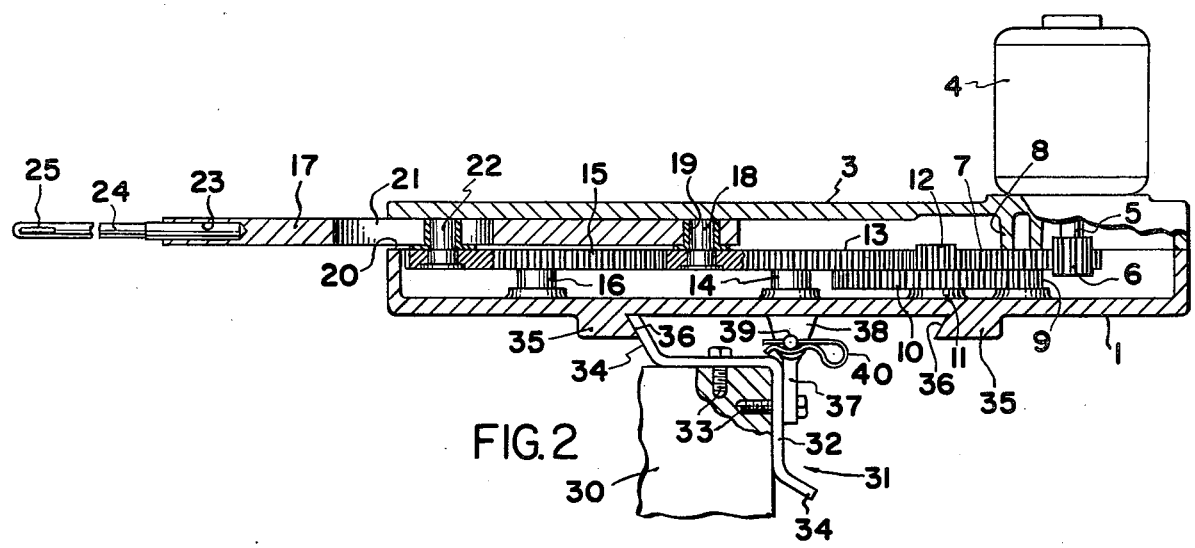
FIG. 2 is a horizontal sectional view of the apparatus shown in FIG. 1 and illustrating the manner in which the apparatus may be mounted on a boat.

The agitating apparatus is adapted to be mounted to the gunwale, or any other desired location, of a boat 30 by mounting means 31 comprising a bracket 32 which may be fixed to the boat by screws 33 and which has angular, spring feet 34 at its opposite ends. The base 1 is provided with latching lugs 35 having inclined surfaces 36 on which the feet 34 are adapted to seat. The bracket 32 includes a hinge leaf 37 and the base 1 has knuckles 38. A hinge pin 39 rockably connects the base 1 to the bracket 32 and is retained by a cotter pin 40. The base thus may be rocked from the horizontal position shown in FIG. 2 clockwise through 90° to an upright position. The spring engagement between the latching lug and the associated foot will yieldably latch the base in either selected position.

The base 1 also is provided with means 41 for mounting a fishing rod. The mounting means comprises a socket 42 having a pair of ears 43 which span a tube 44 carried by the base. A latch pin 45 connects the tube to the socket and is retained by a cotter pin 46. A fishing rod may be fitted into the socket 42 so that a line extending from the rod may be removably secured to the arm 17 by means of the clasp 25. The line will be provided with a suitable lure at its free end.

As the boat moves through the water, the arm 17 is operated via its driving mechanism so that its free end partakes of its orbital movement. As the arm is moved from the full line position shown in FIG. 1 along the path segments 26 and 27, the lure at the free end of the line will be oscillated and first accelerated and then decelerated. As the arm moves along the path segments 28 and 29, the lure again will be oscillated, accelerated, and then decelerated. Such movements of the arm are repetitive.

The movement of the free end of the arm 17 is such that the lure moves intermittently forwardly and laterally of the course of the boat as a consequence of which the lure accelerates, decelerates, and moves not only forwardly, but also laterally in a manner simulating natural movements of a live minnow.

The disclosed embodiment is representative of a presently preferred form of the invention, but is intended to be illustrative rather than definitive thereof. The invention is defined in the claims.

I claim:

1. Apparatus for agitating a fishing line comprising a base; an elongate arm member; a pair of rotary members in driving engagement with each other; means mounting each of said members on said base for rotation about its own axis; means eccentrically connecting said arm member to one of said rotary members for rotation therewith; coupling means eccentrically and slideably connecting said arm member to the other of said rotary members for rotation therewith and for sliding movements relative thereto; and means for rotating said rotary members in opposite directions.

2. Apparatus according to claim 1 wherein said coupling means comprises a longitudinally extending slot in said arm and a stud carried by said other of said rotary members and slideably accommodated in said slot.

3. Apparatus according to claim 1 wherein said driving means comprises rotary gear means.

4. Apparatus according to claim 3 wherein said coupling means comprises a pivotal connection between said other of said rotary members and said arm member.

5. Apparatus according to claim 3 wherein said driving means includes powered means drivingly connected to said rotary members.

6. Apparatus according to claim 1 wherein said arm member has a free end and including clasp means at said free end of said arm member for releasably attaching a fishing line thereto.

7. Apparatus for agitating a fishing line comprising a base; an elongate arm member having a free end; a first rotary member mounted on said base for rotation; means eccentrically connecting said arm member at its other end to said first rotary member for rotation with the latter and in driving engagement with said first rotary member; a second rotary member mounted on said base for rotation; means eccentrically and slideably coupling said arm member between its ends to said second rotary member; and means for driving said rotary members simultaneously in opposite directions.

8. Apparatus according to claim 7 wherein said coupling means comprises a stud fixed to said second rotary member and a slot in said arm member in which said stud is slideably accommodated.

9. Apparatus according to claim 7 including clasp means carried by said arm member adjacent said free end for releasably attaching a fishing line thereto.

* * * * *

UNITED STATES PATENT AND TRADEMARK OFFICE
CERTIFICATE OF CORRECTION

PATENT NO. : 4,120,112
DATED : October 17, 1978
INVENTOR(S) : Alexander J. McBain It is certified that error appears in the above—identified patent and that said Letters Patent are hereby corrected as shown below:

Column 3, line 34 change "rotating" to -- driving --.

Column 4, lines 22 and 23 delete " and in driving engagement with said first rotary member".

Column 4, line 24 after "rotation " insert -- and in driving engagement with said first rotary member --.

Signed and Sealed this

Sixteenth Day of January 1979

[SEAL]

Attest:

RUTH C. MASON
Attesting Officer

DONALD W. BANNER
Commissioner of Patents and Trademarks